June 1, 1937.  R. SAULNIER  2,082,598
AIRPLANE LANDING GEAR
Filed March 19, 1936   12 Sheets-Sheet 3
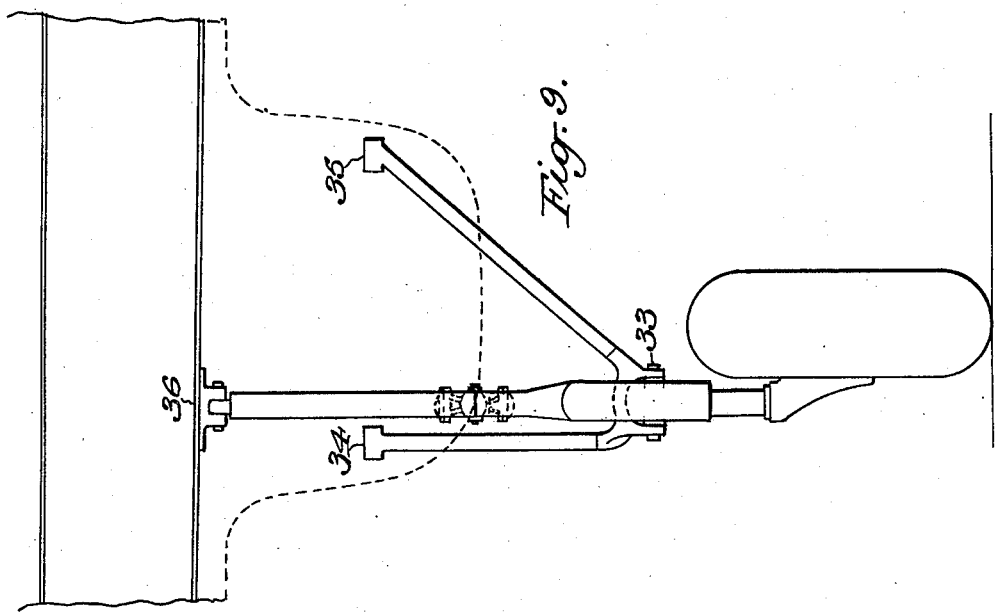
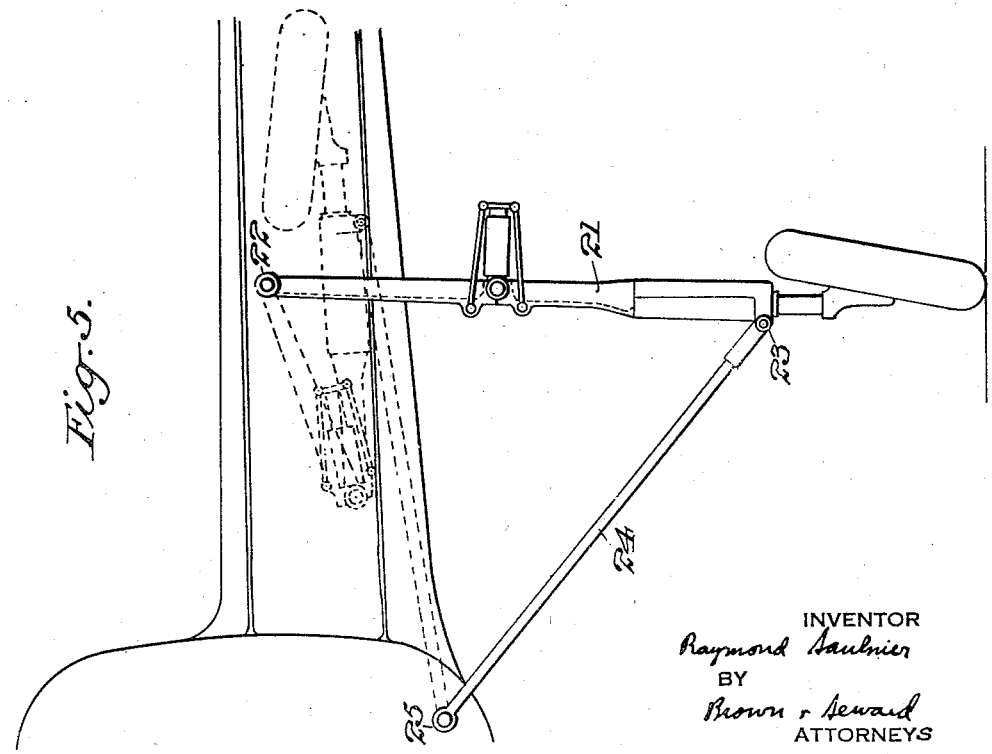
INVENTOR
Raymond Saulnier
BY
Brown + Seward
ATTORNEYS June 1, 1937.  R. SAULNIER  2,082,598
AIRPLANE LANDING GEAR
Filed March 19, 1936   12 Sheets-Sheet 4

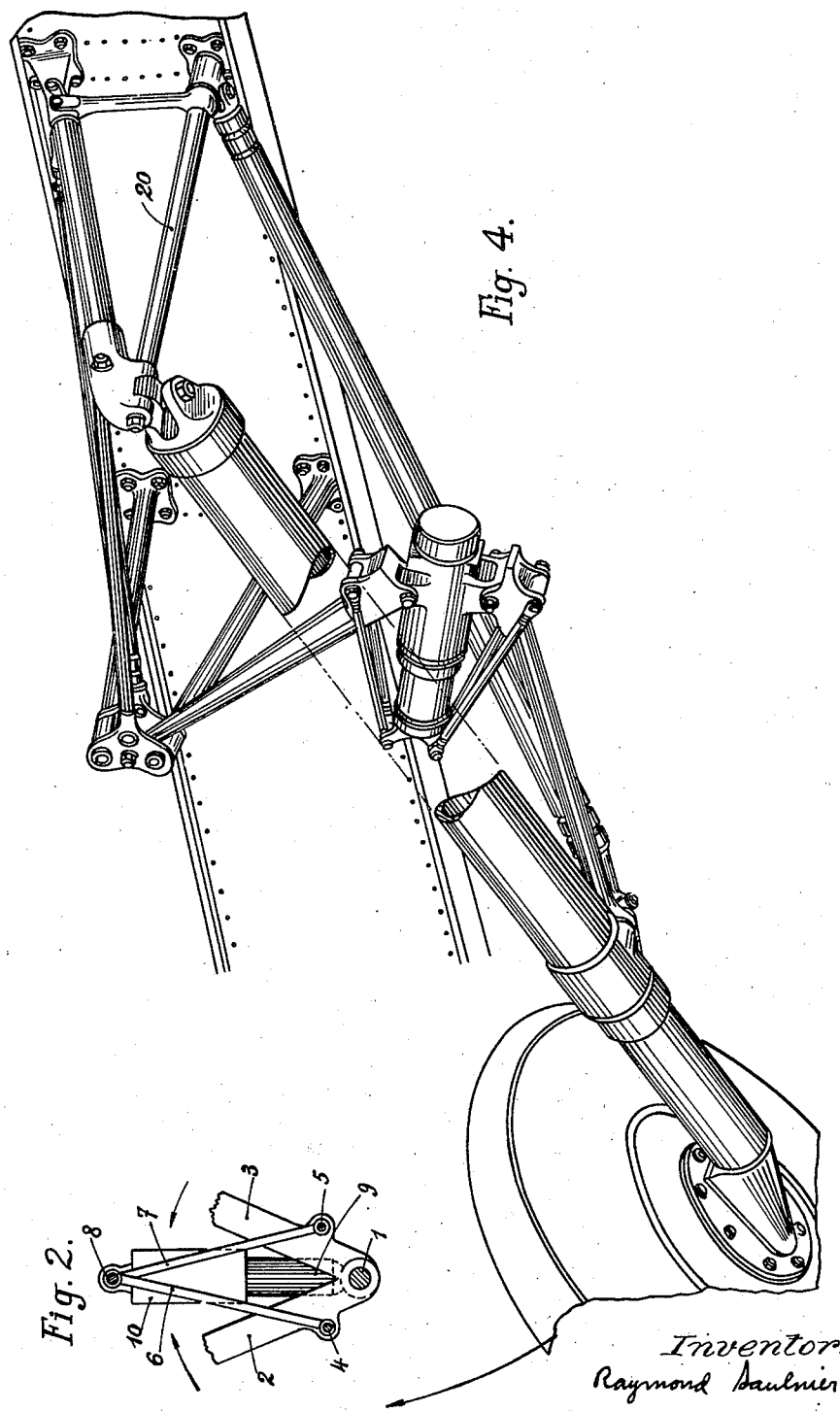

Inventor:-
Raymond Saulnier
By Brown. Seward
Attorneys

June 1, 1937.   R. SAULNIER   2,082,598
AIRPLANE LANDING GEAR
Filed March 19, 1936   12 Sheets-Sheet 5

Inventor:
Raymond Saulnier
By
Brown & Renard
Attorneys

June 1, 1937. R. SAULNIER 2,082,598
AIRPLANE LANDING GEAR
Filed March 19, 1936 12 Sheets-Sheet 6

Inventor:-
Raymond Saulnier
By Brown & Seward
Attorneys

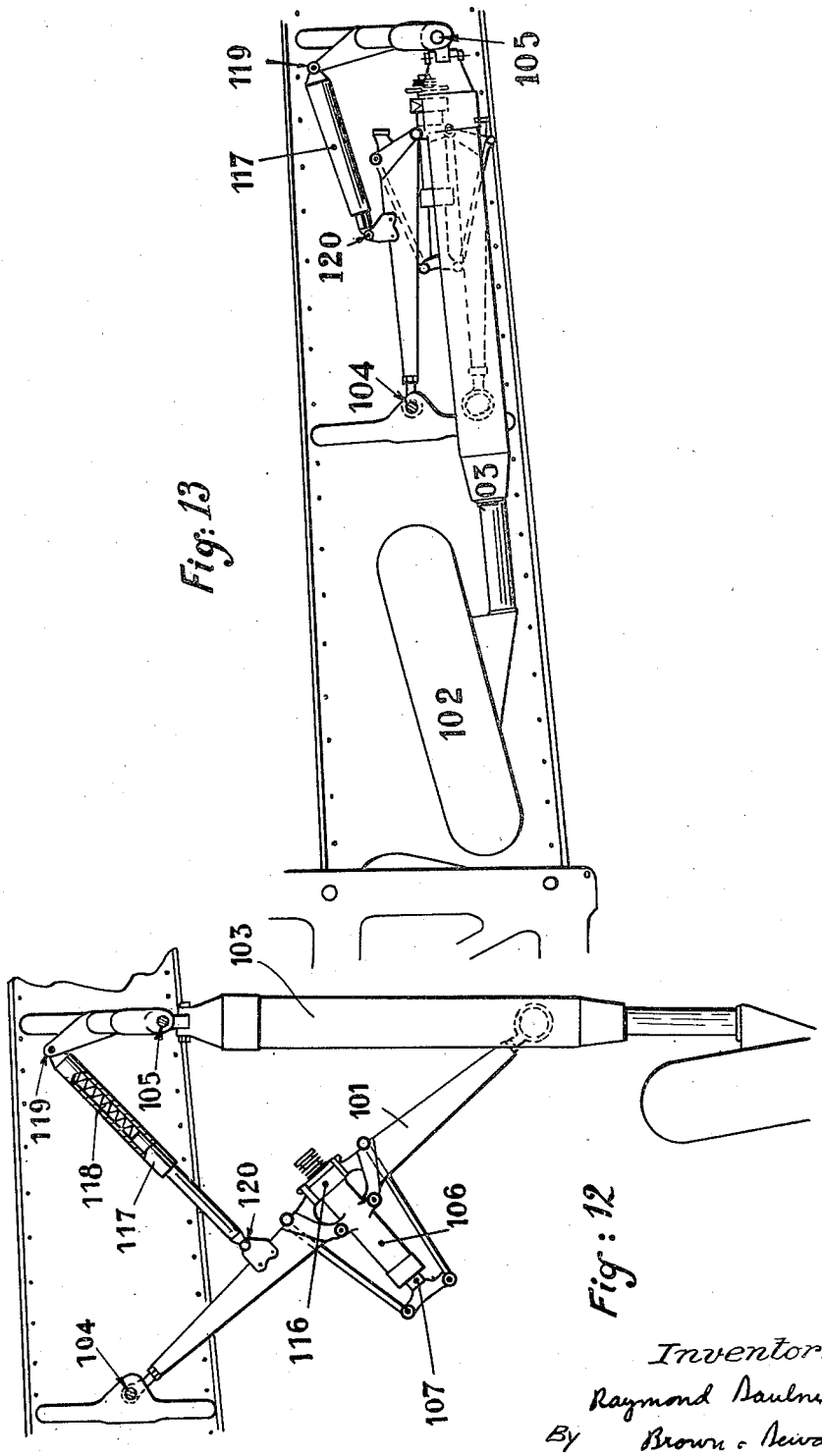

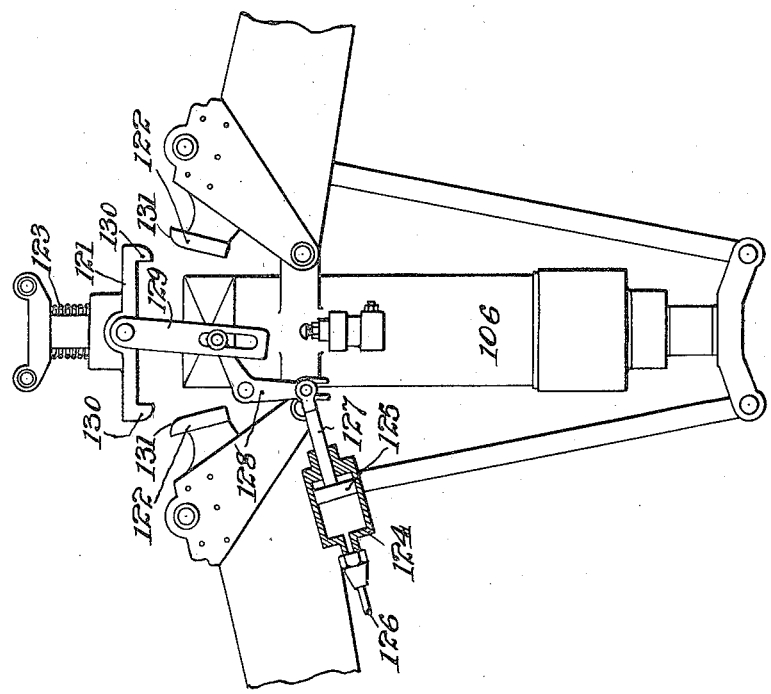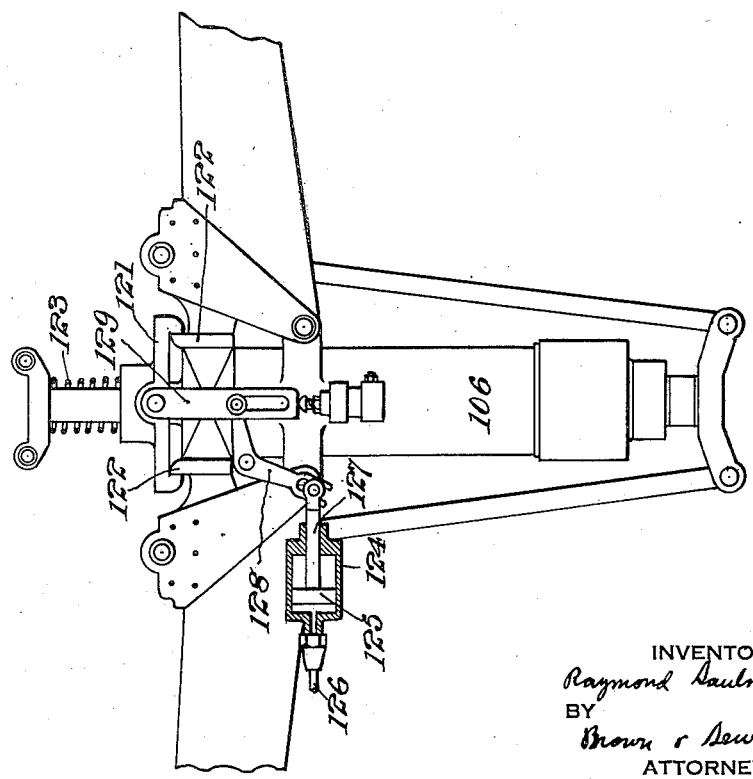

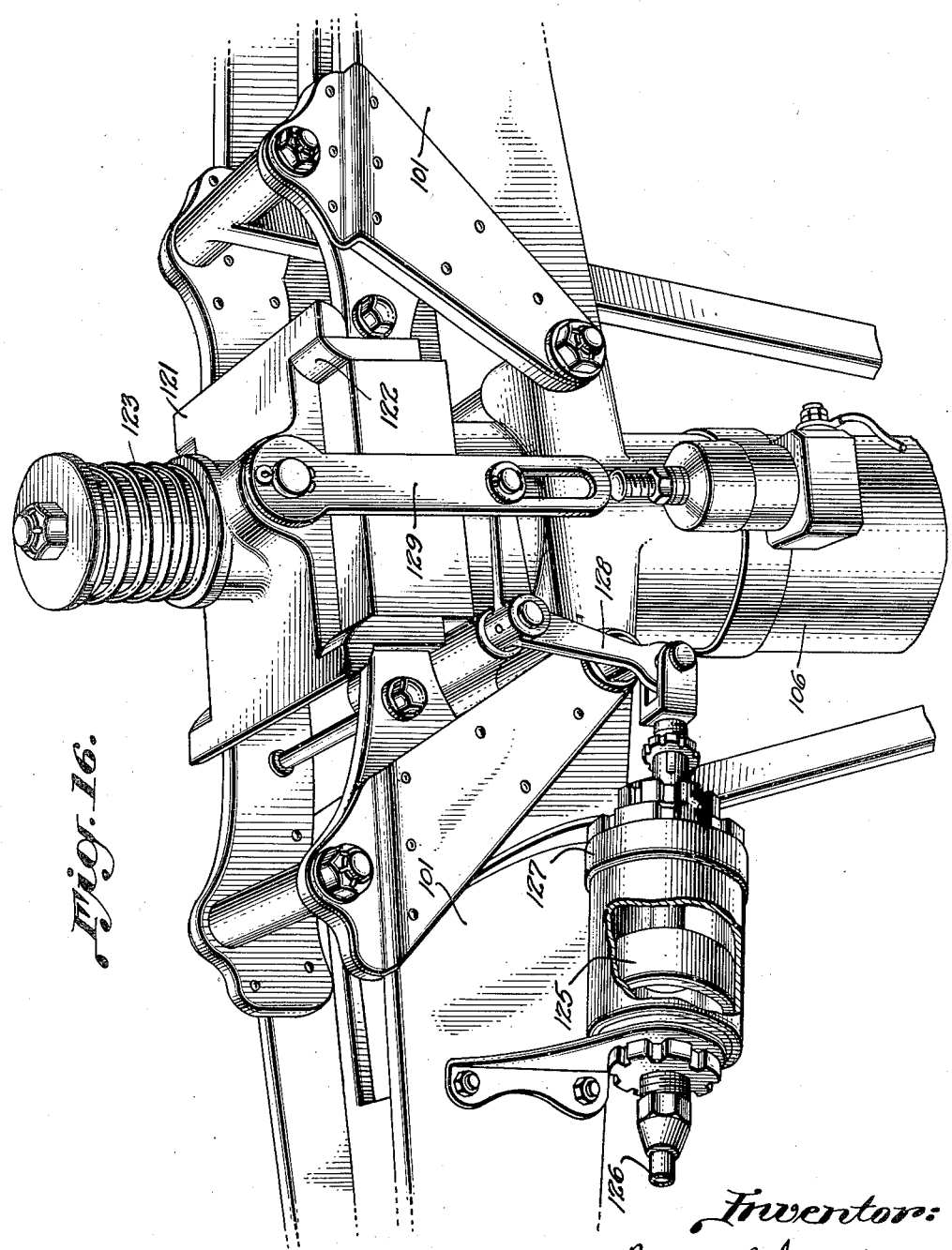

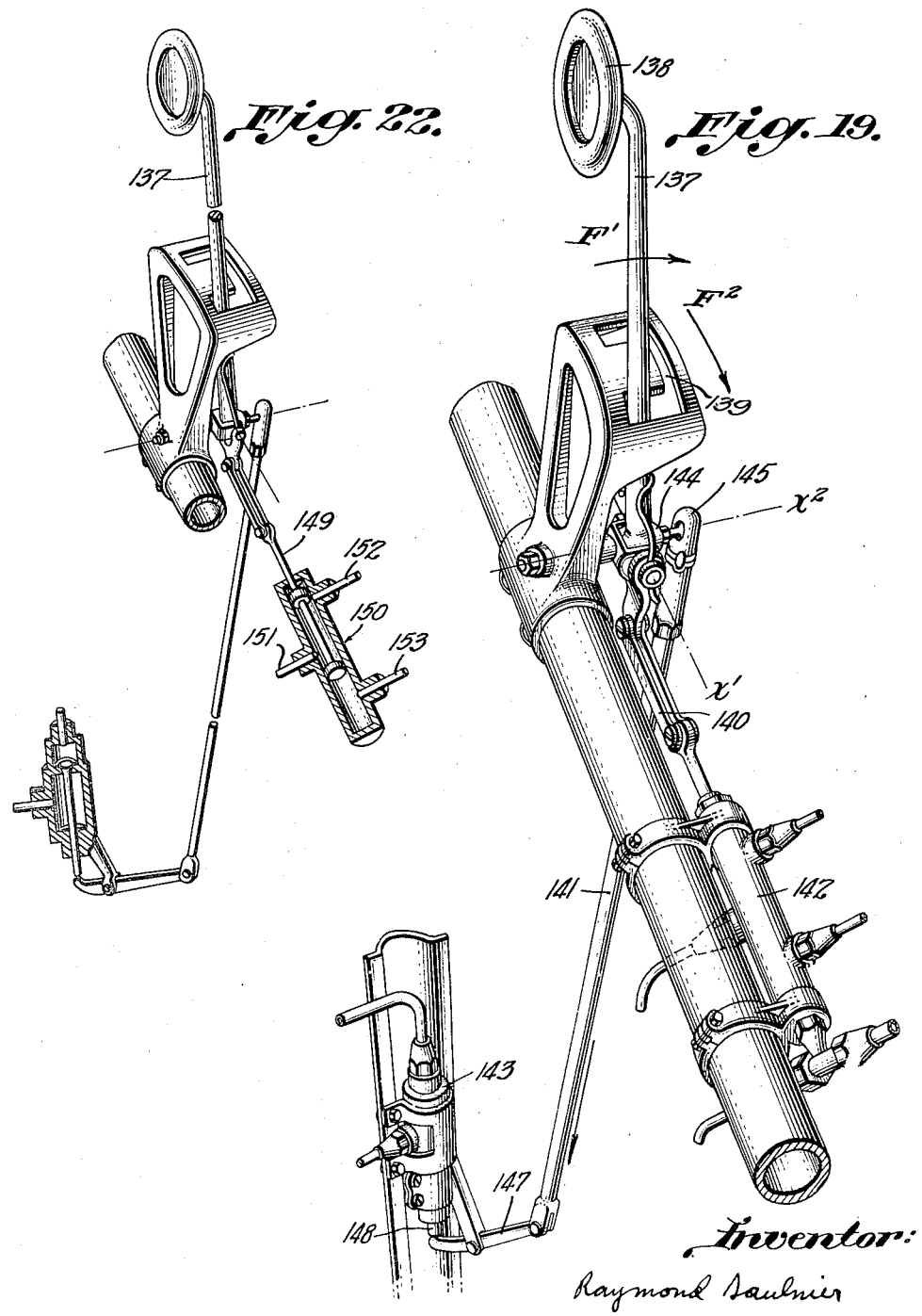

June 1, 1937.  R. SAULNIER  2,082,598
AIRPLANE LANDING GEAR
Filed March 19, 1936  12 Sheets-Sheet 12
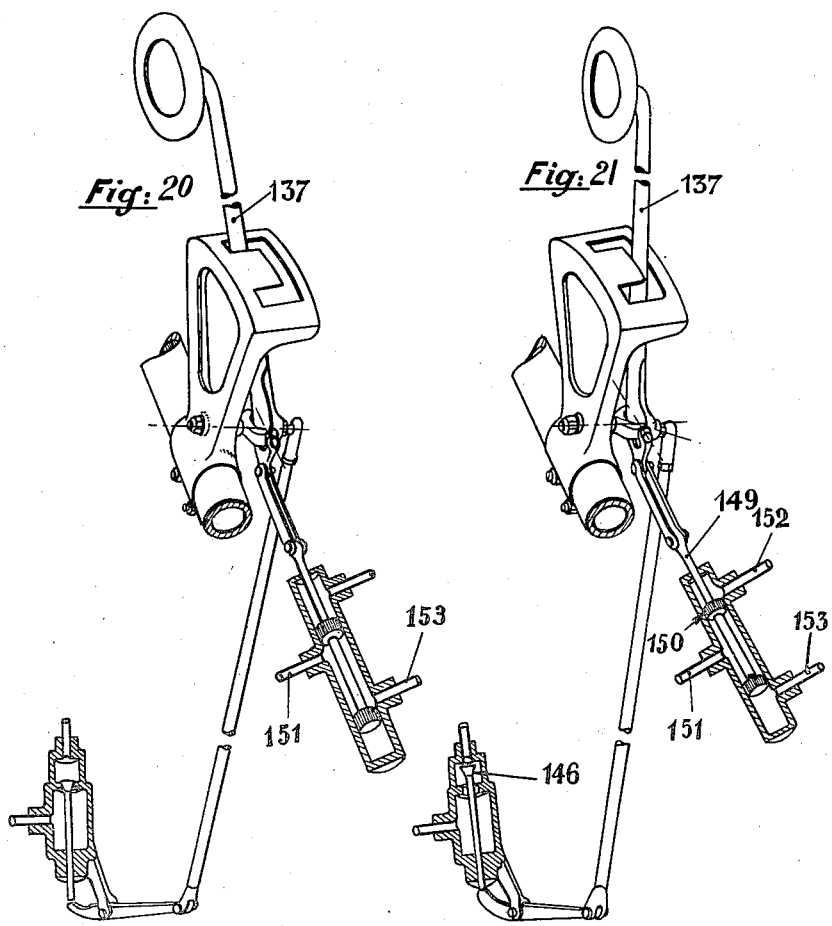
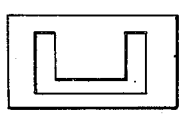 
Inventor:-
Raymond Saulnier
By Brown & Seward
Attorneys Patented June 1, 1937

2,082,598

UNITED STATES PATENT OFFICE 2,082,598

AIRPLANE LANDING GEAR

Raymond Saulnier, Puteaux, France

Application March 19, 1936, Serial No. 69,627
In Germany March 22, 1935

18 Claims. (Cl. 244—102)

The present invention relates to retractable landing gears for airplanes consisting of three struts each connected at one end to the airplane and at the other end to the wheel support, one of said struts consisting of two bars articulated together and subjected to the action of a device capable of bringing these bars either into a position in which they are in line with each other or into a position in which they make with each other an angle which may be equal to zero.

There exist systems of this kind, provided with a device for straightening or folding up such a jointed strut included in a retractable landing gear for an airplane. However in these prior systems, the force intended to expand or to retract the landing gear through the angular relative displacement of the elements of the jointed strut is supplied by a device such as a screw or the like, connected on the one hand, through a system of connecting rods, with these two elements of the jointed strut, and on the other hand with a fixed part of the airplane, such as the wing or the fuselage. With a system of this type, the landing gear can obviously be retracted only in a predetermined direction. Any modification of this direction, as may be required for instance by a modification of the position of the fuel tanks, engines, etc., would produce a complete modification of the landing gear and of the means interconnecting it with the airplane for controlling retraction or expansion of said landing gear.

Furthermore, in most of the systems of this type existing at the present time, it is necessary to provide cables or chains, for controlling the operation of the retractable gear, adapted to cooperate with pulleys or toothed wheels and which do not ensure full safety of working.

In a likewise manner, in many constructions of the type above referred to, it is necessary to render movable the points, or at least one of the points, at which the struts of the landing gear are pivoted to the airplane, which further complicates construction and reduces reliability of operation. As it is absolutely necessary that the parts of the structure should be as light as possible and should occupy a volume as reduced as possible, while working in a perfectly reliable manner, it is clear that existing landing gears of the type above referred to cannot be considered as satisfactory.

The object of the present invention is to provide a retractable landing gear of the kind above referred to which obviates these drawbacks.

According to an essential feature of the present invention, the element which controls the operation of the jointed strut (by bringing the parts thereof either into line with each other, or on the contrary, into relative positions in which said parts make various angles with each other) is connected with said jointed strut by a suitable system of connecting rods in such manner that this control element or device is carried by said parts and has no direct connection with the fixed parts (wings, fuselage, etc.) of the airplane. In a more specific manner, the two bars forming the jointed strut are connected with the piston or the cylinder or a hydraulic or pneumatic jack (or equivalent device) disposed perpendicularly to the jointed strut when the latter is fully expanded, that is to say with its bars in line with each other, which corresponds to the extended or landing position. The jack is wholly independent of the airplane proper (with the exception, of course, of the conduit through which the hydraulic or pneumatic fluid is fed to said jack, or the electric wires, in the case of an electric control), said jack being entirely supported by the jointed strut, through the mechanical connections provided between said jack and said bars. With such an arrangement, the control device is wholly independent of the other parts of the airplane.

These mechanical connections between the control device and the two bars of the jointed strut consist of connecting rods or pairs of connecting rods, pivoted to the bars of the jointed strut at respective points thereof located on either side of the articulation of said bars, symmetrically with reference to this articulation, and at a certain distance from the axis of this articulation. The other ends of these connecting rods are pivoted to the cylinder or the piston of the jack.

According to another feature of the present invention, the two bars of the jointed strut are brought in the extended position of the landing gear, into positions slightly beyond the positions in which they are in line with each other, and maintained in this safety position through suitable means. In this case, the jack must be capable of moving the bars past the dead center position, that is to say the position in which the bars are in line with each other.

It will be readily understood that when the airplane takes off, there is no risk of a bad working of the landing gear, since this working can easily be checked before taking off. Therefore, in order to avoid any accident, it suffices to make sure that nothing can occur, when flying, which could prevent the landing gear from extending once it has been retracted. The only breakdowns that are possible are those that may occur in the working of the control device. In particular, when said control device consists of a jack operated by oil under pressure, breakdowns may result from a defective feed of oil to the jack, which might result in a failure of the landing gear to extend at the desired time.

A feature of the present invention consists in the provision of a safety device capable of compelling the landing gear to extend, in case of breakdown of the control device.

Furthermore, when the landing gear is in the extended position, it is necessary to positively prevent it from retracting when the airplane is running on the ground. When the device for controlling the operation of the landing gear consists of a hydraulic or pneumatic jack, it may happen that, the pressure in the jack cylinder having dropped for some reason, the shocks undergone by the landing gear cause the parts of the jointed strut to move past the dead center position, which would cause the landing gear to retract.

A feature of the present invention consists in the provision of positive locking means adapted to be brought into active position when the landing gear is fully extended and which wholly prevent accidental retraction.

These locking means are brought out of action by the pilot before retracting the landing gear. They are automatically brought into play as soon as the landing gear is fully extended.

Finally, it is necessary, when such a locking device is provided, to arrange the controls in such manner that the locking device is necessarily brought out of action before folding up the jointed strut so as to retract the landing gear, so as to avoid deterioration of said landing gear, as might take place if the jack exerted an action tending to fold up the jointed strut before the locking device has been brought out of operation.

A feature of the present invention consists in successively controlling the release of the locking means and the retraction of the landing gear through a single operating organ.

Other features of the present invention will result from the following detailed description of some specific embodiments thereof.

Preferred embodiments of the present invention will be hereinafter described, with reference to the accompanying drawings, given merely by way of example, and in which:

Fig. 2 is a view, similar to Fig. 1, showing the parts in a different position;

Fig. 4 is a view of the same landing gear, in the retracted position;

Fig. 5 is a front view of a landing gear according to another embodiment;

Fig. 9 is a side elevational view of the landing gear of Fig. 8;

Fig. 12 is a view, similar to Fig. 10, showing, in the extended position, another embodiment of a landing gear provided with a safety device, according to the invention;

Fig. 13 is a view of the landing gear of Fig. 12, in the retracted position;

Fig. 14 is a detail view of a locking device for use with a landing gear according to the present invention;

Fig. 15 is a view, similar to Fig. 14, of this locking device in a different position of the parts;

Fig. 16 is a perspective detailed view of this locking device;

Fig. 19 shows a control arrangement permitting to operate, through a single control member, the locking device and the jack or other equivalent device for operating the retractable landing gear, according to the present invention;

Figs. 20, 21, and 22 diagrammatically show the arrangement of Fig. 19, in three different positions thereof;

Figs. 23 and 24 are detail views illustrating modifications of parts of the structure of Fig. 19.

Figures 1, 3:
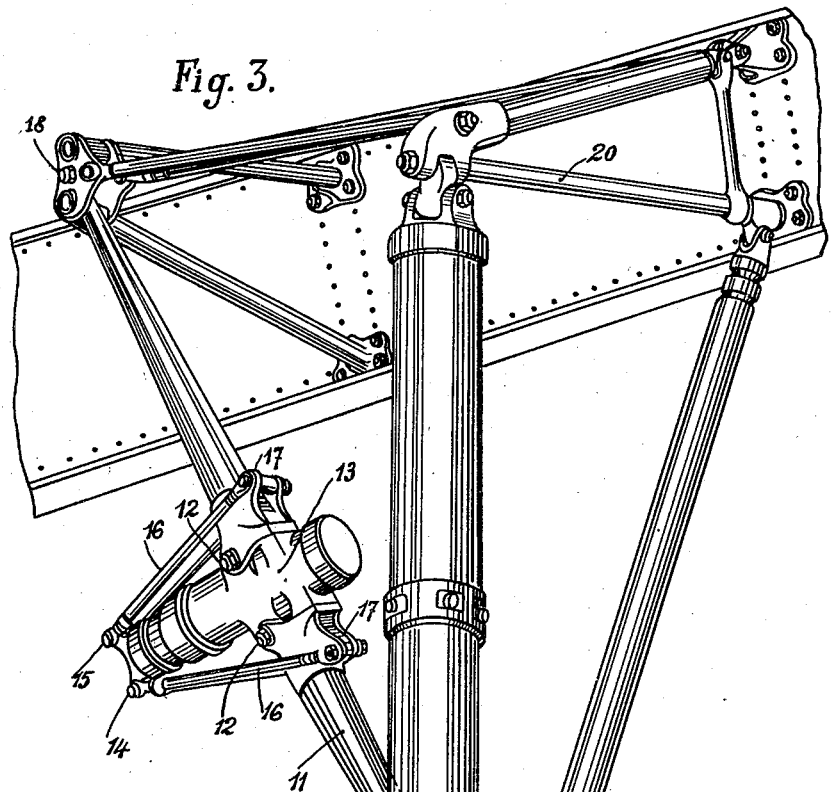
Fig. 1 is an elevational view of a jointed strut according to the present invention, provided with its control device.
Fig. 3 is a perspective view of a landing gear according to a first embodiment of the present invention, said landing gear being shown extended, that is to say in the landing position.

In Figs. 1 and 2, I have shown, at 2 and 3, two connecting rods articulated together about an axis or pivot 1, so as to pivot about said axis, whereby they can be either brought into line with each other (Fig. 1) or caused to make an angle with each other (Fig. 2) by rotation in the direction of the arrows.

In the example shown by the drawings, the control device intended to act on said rods 2 and 3 consists of a pneumatic jack 10, including a piston 9 the end 8 of which carries a pivot for two connecting rods 6 and 7 the other ends of which are pivoted to bars 2 and 3 at points 4 and 5. When a compressed fluid is admitted into the jack cylinder, piston 9 is driven outwardly with respect to body 10 and connecting rods 6 and 7 cause bars 2 and 3 to pivot about axis 1 in the direction of the arrows of Fig. 2.

It will be readily understood that, being given the direction in which the effort is exerted, the device has no dead center position and its operation is perfectly reliable.

Furthermore, it will be apparent that the structure is very simple. It involves no supplementary system of connecting rods, the control device consisting of a single jack.

As above stated, it should be well understood that the invention is in no way limited to the specific embodiment of the articulation above described with reference to Figs. 1 and 2; nor is it limited to a specific control device such as a pneumatic jack. In particular, instead of being articulated about a common axis, the elements of the jointed strut might be articulated about two distinct axes, as it will be shown in embodiments hereinafter described. Also the ends of the connecting rods might be fixed to the control device in a different manner, and so on.

In Figs. 3 to 9, I have shown various embodiments of landing gears according to the present invention.

Figs. 3 and 4 show a retractable landing gear in which retraction takes place in the lateral direction as shown by Fig. 4. The structure includes a jointed strut 11 the elements of which are pivotally connected at 12 on either side of a jack 13. The piston 14 of this jack pivotally carries, at its end 15, two double connecting rods 16 the opposite ends of which are fixed to points 17 of the jointed strut elements, respectively. This jointed strut 11 connects a fixed point 18 of the airplane to the lower part of the landing gear, at 19, in such manner that, when said strut 11 is folded up, it draws the landing gear, which is pivoted about stationary spindle 20.

This structure works in the following manner:
When compressed fluid is fed into the jack, the piston thereof is driven outwardly, and double connecting rods 16 are driven by spindles 15. By pulling on parts 17, which rotate about spindles 12, these connecting rods cause the elements of the jointed strut to pivot about the body of the jack, since points 17 are located on the respective outer sides of articulations 12. Point 19 is drawn toward point 18 and the landing gear to be retracted is folded up, by rotating about spindle 20, as clearly shown by Fig. 4, until the two elements of jointed strut 11 are brought against the jack.

It will be noted that, in this example, the landing gear undergoes no important modification with respect to ordinary landing gears which are not retractable. It suffices to devise the upper articulation of the landing gear in such manner that said gear can pivot about a stationary axis, such as 20, and to give one of the struts of the wheel support the form of a jointed structure provided with a control device such as jack 13.

A landing gear according to the present invention is therefore extremely simple and little expensive. Furthermore, the landing gear is brought into the extended position under the mere action of the weight of the wheel, whereby any risk is avoided of having the landing gear jammed in the retracted position, at the time of landing. On the other hand, retraction takes place in a perfectly safe and reliable manner, since the device has no dead center position and the effort exerted on the knuckle for folding up the structure is exerted in the best possible direction for obtaining an efficient and reliable working.

Besides, this feature may be made use of for obtaining a safe locking of the landing gear in the extended position. For this purpose, the elements of the jointed strut are allowed to move beyond the position in which they are in line with each other, their displacements being limited by suitable stops, in such manner that, in the extended position of the landing gear, the latter is perfectly rigid. In order to retract said gear, the control device is capable of easily moving the elements of the jointed strut beyond the dead center position, so that the structure is then folded up.

In Fig. 5, I have shown another embodiment of a retractable landing gear in which the wheels are moved laterally. In this example, retraction, instead of taking place toward the fuselage, takes place toward the wing tip. In this embodiment of the invention, the strut which is replaced by a jointed structure, instead of being one of the lateral struts as in the embodiment of Figs. 3 and 4, consists of strut 21 which contains the shock absorber. In this figure 22 is the articulation of strut 21 to the airplane; 23 is the articulation of strut 21 to strut 24; and 25 is the articulation of said strut 24 to the airplane.

In Fig. 5 the extended position of the landing gear is shown in solid lines and the retracted position is shown in dotted lines. In this last mentioned position the landing gear is housed in the wing. The axis O of the articulation comes into position O'.

Figure 6:
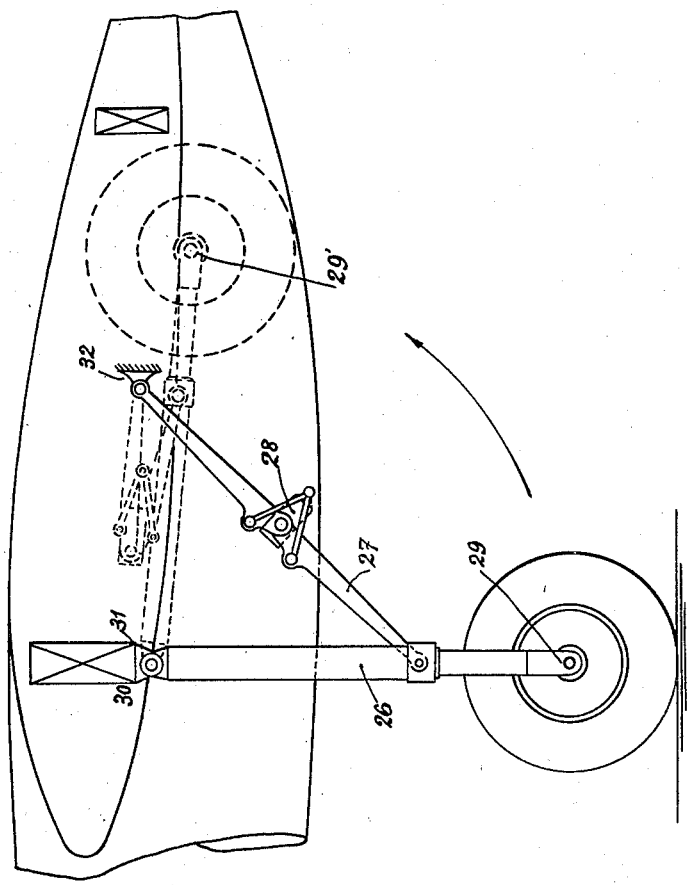
Fig. 6 is a side elevational view of a landing gear according to another embodiment, in which retraction is obtained by a movement of the wheel from the front toward the rear.
Figure 7:
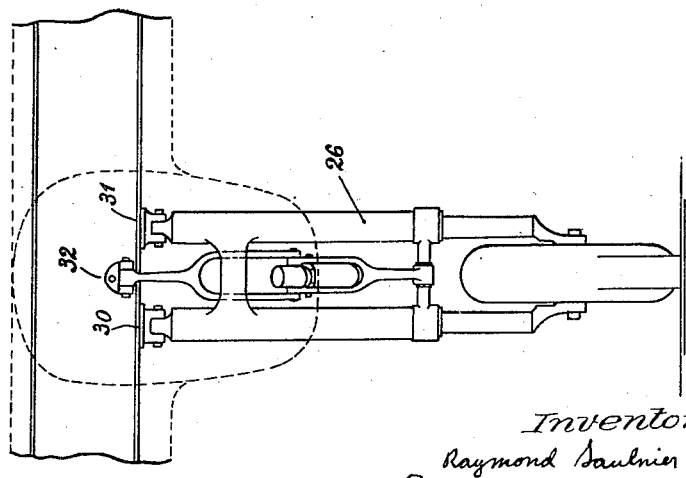
Fig. 7 is a front view of the landing gear of Fig. 6.

In Figs. 6 and 7, I have shown another embodiment of the retractable landing gear according to the present invention. This embodiment is especially applicable to multi-engined airplanes. In this case, the landing gear, instead of retracting laterally, is retracted rearwardly. The wheel may be fitted to the landing gear in any suitable manner. In the example illustrated by Figs. 6 and 7, this wheel is supported by a fork 26, which contains the shock absorber or shock absorbers. Strut 27 consists of a jointed structure provided with a control device 28 (jack for instance) according to the essential feature of the invention. In Fig. 6, the extended position is shown in solid lines while the retracted position is shown in dotted lines.

Fig. 6 also shows, at 29, the wheel axle, which is maintained, when the landing gear is retracted, in position 29'. The three pivots by means of which the landing gear is secured to the airplane are shown at 30, 31, and 32.

Figure 8:
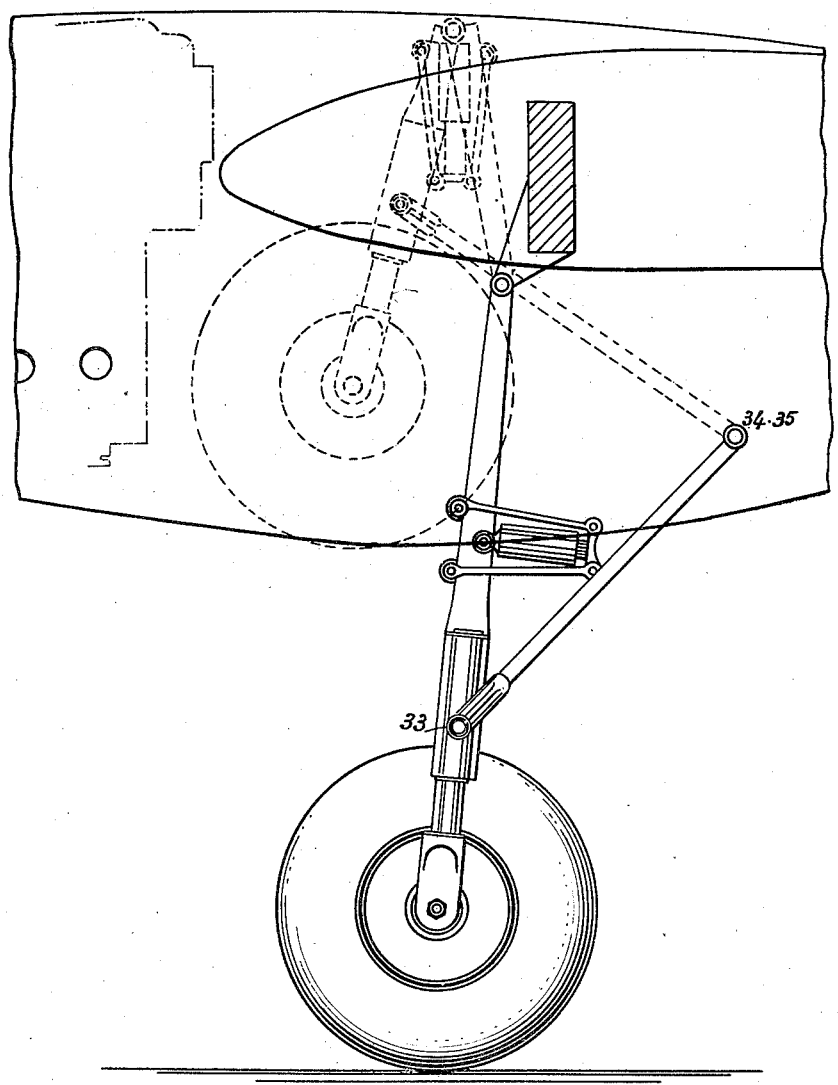
Fig. 8 is a front view of still another embodiment of the invention, in which retraction is obtained by a movement of the wheel from the rear toward the front.

Figs. 8 and 9 show another embodiment of the landing gear according to the invention, in which retraction takes place toward the front. In this example, as shown by Fig. 9, the wheel, instead of being supported in a fork, is mounted in overhung position. It should be well understood that, whatever be the retraction system that is used, the wheel may be mounted, at will, as the case may be, either in a fork or in overhung position. The examples disclosed are merely intended to show various possibilities which may be combined at will with various arrangements of the landing gear according to the invention.

In particular, it will be noted that, in the embodiment of Figs. 8 and 9, the jointed strut replaces the rigid bar including the shock absorber, while, in the embodiment of Figs. 6 and 7, this jointed strut replaces one of the two other bars of the landing gear.

In Fig. 8, the position of the landing gear in which it is extended, for landing, is shown in solid lines, while the retracted position is shown in dotted lines. The axes of articulation are respectively shown at 33, 34, 35, and 36. Axes 34, 35, and 36 are fixed oscillation axes with reference to the airplane.

Figure 11:
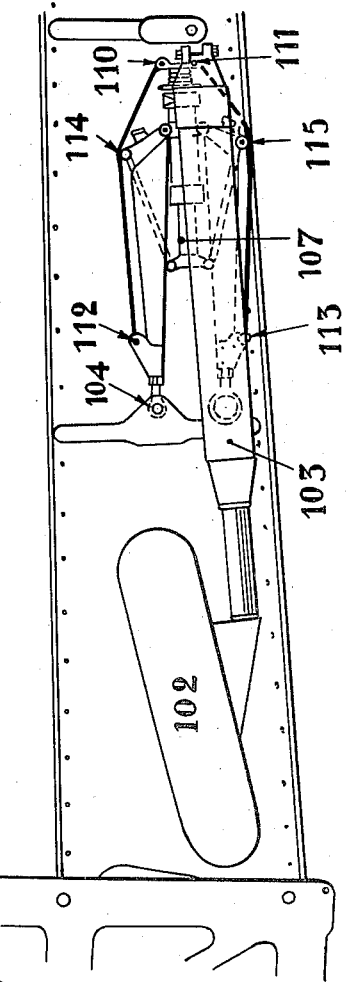
Fig. 11 is a view, similar to Fig. 10, showing the landing gear in the retracted position.
Figure 10:
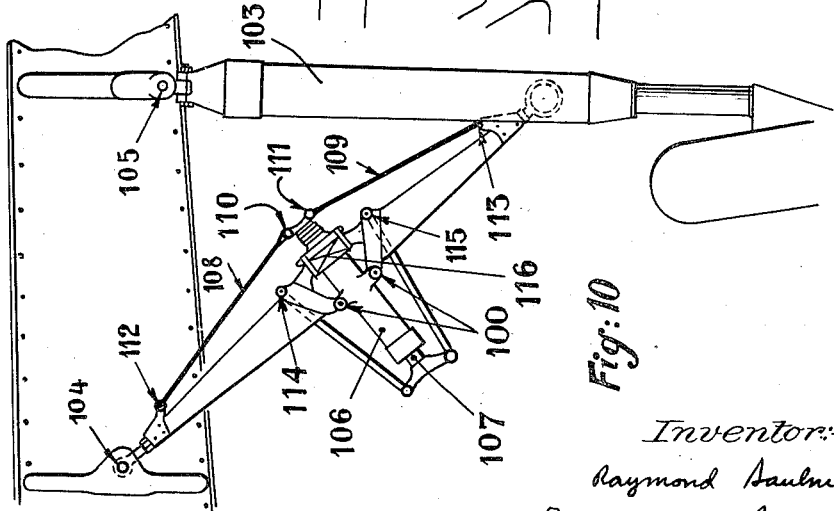
Fig. 10 is a front view of a landing gear according to the invention, provided with a safety device.

In the embodiment of Figs. 10 and 11, reference character 101 shows the jointed strut of a retractable landing gear of the type above described. 102 is the wheel, and 103 the strut provided with the shock absorber. 104 and 105 are the pivots of struts 101 and 103. The control device of the landing gear consists, in this example, of a hydraulic jack (or possibly a pneumatic jack) 106, the piston of which is shown at 107. In this embodiment, the extension or unfolding of the landing gear is automatically ensured in case of a failure of the feed of oil (or any other fluid) at the desired time. This automatic operation is performed through a group of elastic cables 108 and 109, fixed, on the one hand, to the head of the jack, at 110 and 111, respectively, and, on the other hand, to the elements 108 and 109 of the jointed strut, at points 112 and 113. These two elastic cables are arranged in such manner that their tension produces, for all positions of the landing gear, a torque tending to bring the two strut elements 108 and 109 into line and to maintain them in this position. This result is obtained owing to the provision of two parts 114 and 115, which keep the elastic cables at a distance from the points of articulation O, when the jointed strut is folded up, as clearly shown by Fig. 11.

The operation of this device can easily be understood: When the pressure in the jack drops, the tension of the elastic cables, which always tends to bring the two strut elements into line with each other, and therefore to extend the landing gear, is no longer balanced, and produces the extension of the landing gear, moving the wheel downwardly. This action takes place until the two strut elements come to butt, after having moved beyond the dead center position, against the jack head 116, that is to say until the landing gear is in its final landing position.

In the embodiment of Figs. 12 and 13, the device for automatically extending the landing gear is made in a different manner. In this example, this device consists of a telescopic rod 117, provided with a spring 118, which always tends to bring the landing gear back into the extended position.

One of the ends of this rod 117 is pivoted at 119 to the wing of the airplane and the other end is pivoted, at 120 to one of the elements of jointed strut 101. The operation of this device can easily be understood: When the landing gear is retracted, under the action of jack 106, point 120 turns about axis 104, and this movement brings rod 117 into the position of Fig. 13, reducing the length thereof and compressing spring 118. The whole is maintained in the position of Fig. 13 by the oil pressure in the jack. If the pressure in question happens to drop, as the spring is no longer balanced, rod 117 expands under the action of this spring, bringing the landing gear back into the extended position, that is to say the position shown by Fig. 12.

As above stated, the invention further includes a device for locking the landing gear in the extended position independently of the jacket, and in a positive manner.

According to the embodiment shown by Figs. 14 to 18 inclusive, this locking is obtained by means of a piece 121 (Figs. 14 and 15), which will be hereinafter called "locking piece". This piece slides along the axis of the jack and acts in cooperation with two lugs 122, provided on the ends of the two elements of the jointed strut. The locking piece is urged toward the locking position by a spring 123. The device further includes means, of any kind whatever, operated through a hydraulic, pneumatic, electric or mechanical system, brought into play from the pilot's seat, for unlocking the device so as to make it possible for the jointed strut to fold up before operating the jack 106 which controls this folding operation.

In the example shown by Figs. 14 and 15, the means for bringing the locking piece out of action include a cylinder 124, inside which is provided a piston 125, cylinder 124 being fed with a fluid, such for instance as compressed air, supplied through a conduit 126. Piston 125 operates locking piece 121 through a system of connecting rods 127, 128 and 129. The outer parts 131 of lugs 122 are made of a rounded shape in such manner that the locking piece is automatically lifted by the pressure of the lugs 122, at the end of the downward movement of the landing gear, when the outer portion 131 of these lugs comes into contact with the outer part 130 of the hooks of the locking piece 121. Locking is then automatically obtained when the two lugs come to butt against the head 116 of the jack, under the action of spring 123.

As above stated, Fig. 14 shows the locking position and Fig. 15 shows the unlocked position. In these figures, the positions of transmission 127, 128 and 129 is clearly visible, this transmission being operated by piston 125.

Figure 17:
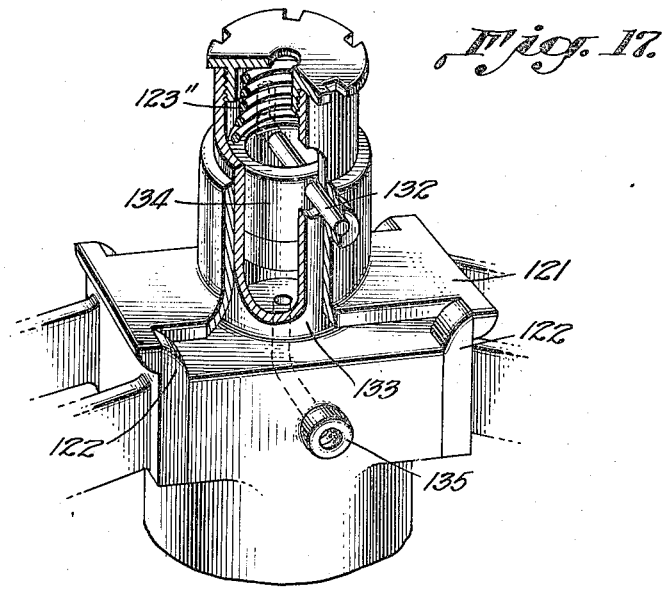
Fig. 17 is a perspective view, with parts cut away, of a modification of this locking device.
Figure 18:
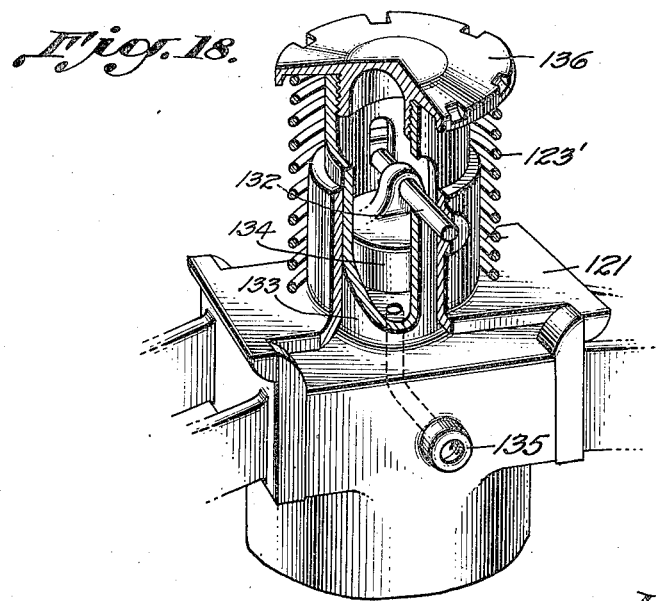
Fig. 18 is a view, similar to Fig. 17, of another modification of this locking device.

In the example of Figs. 14 and 15, the member which directly controls the unlocking consists of a cylinder 124 carried by one of the elements of the jointed strut. In the embodiments of Figs. 17 and 18, the member which controls the unlocking is disposed at the end of the jack and acts directly on locking piece 121, through a pin 132. In this embodiment also, the operating device consists of a cylinder 133 inside which there is provided a piston 134, cylinder 133 being fed with compressed air (or any other fluid) through a conduit 135.

In the embodiment of Fig. 18, a spring 123' is disposed on the outside of the cylinder, between the head 136 of the device and locking piece 121.

In the embodiment of Fig. 17, spring 123'' is located on the inside of cylinder 133, between the end of piston 134 and head 136.

Of course, I may, without departing from the principle of the invention, provide other arrangements.

Fig. 16 is a perspective view of a practical embodiment of the locking system, of the type of that diagrammatically shown in Figs. 14 and 15.

As above explained, it is quite necessary to unlock the landing gear before acting on the device which controls its retraction. For this purpose, I provide a mechanism whereby a single handle or control produces, in predetermined order, the operation of the locking mechanism and that of the retracting mechanism.

According to the embodiment of Fig. 19, the single control organ consists of a lever 137, carrying at its end a handle 138 and adapted to move in a notch 139, which permits of giving said lever two displacements at right angles to each other. The movement in the direction of arrow $F^1$ is intended to unlock the landing gear, while the movement in the direction of arrow $F^2$ controls the extension or the retraction of said landing gear.

In the example illustrated by the drawings, the successive operations are the following: Supposing that lever 137 is in the front notch of slot 139 (Fig. 20), the first movement, in the direction of arrow $F^1$, intended to move lever 137 from the front notch and to bring into the front end of the longitudinal part of slot 139 causes the landing gear to be unlocked. The second movement, in the direction of arrow $F^2$, which brings the lever from the front end to the rear end of the longitudinal part of slot 139, causes the landing gear to be retracted, by feeding oil under pressure into jack 106. The third movement, intended to bring the lever into the rear notch of slot 139 (Fig. 22) releases the locking piece.

The movement in the opposite direction produces first the upward displacement of the locking piece, then the extension of the landing gear, and, finally, the locking thereof in the extended position.

Figs 20, 21, and 22 diagrammatically show the positions of the organs, respectively, when the landing gear is extended and locked (Fig. 20), in the course of the retraction, during which the locking piece has first been lifted so as to permit of retracting the landing gear (Fig. 21), and finally when the landing gear is retracted (Fig. 22).

Lever 137 is pivoted about two axes at right angles to each other $X^1$ and $X^2$, thus forming a Cardan articulation. A system of two connecting rods 140—141 controls valve 142 of the main jack 106, and valve 143 which controls the unlocking action, respectively. The various parts are arranged in such manner that, during the movement of lever 137 in the direction of arrow $F^1$, which controls the locking and the unlocking action, said lever has no action whatever on connecting rod 140 which actuates the main jack 106. This result is obtained owing to the provision of the Cardan articulation 144. In a likewise manner, during the movement of the lever in the direction of arrow $F^2$, said lever has no action whatever on connecting rod 141, owing to the knuckle articulation provided at the end of said connecting rod.

The mechanism works in the following manner: Supposing that lever 137 is in the position of Fig. 20, which corresponds to the extended position of the landing gear, in order to retract the landing gear, the lever is caused to move from one end of slot 139 to the other end. Consequently, this lever is given a transverse displacement in the direction of arrow $F^1$ of Fig. 19, then acting only on valve 143, by opening valve 146, whereby compressed air is admitted into cylinder 124 of Figs. 14, 15, 16 or into cylinder 133 of Figs. 17 and 18, and produces a sliding displacement of locking piece 121, thus unlocking the landing gear. In the course of this movement, lever 137 turns about axis $X^1$, pushing connecting rod 141, and, through spring 147, acting on the piston 148 of valve 143.

The displacement in the direction of arrow $F^2$ of Fig. 19 no longer acts on connecting rod 141 but merely on connecting rod 140, under the effect of a pivoting movement about axis $X^2$. This movement brings rod 149, and therefore the double piston 150 of the distributing device 142 from the position of Fig. 20 (in which oil admitted into the distributing device through conduit 151 passes into conduit 152, communicating with the lower part of jack 106, which keeps piston 107 drawn in) into the position of Fig. 22 (in which oil is sent into conduit 133, communicating with the upper part of the jack, so as to cause the piston to move outwardly, whereby the landing gear is retracted). In Fig. 21, piston 150 is shown in the intermediate position, in which oil, fed through conduit 151, communicates with none of the outlets 152 and 153.

In Fig. 23, I have shown a shape of slot 139 similar to that shown in Figs. 19 and 22.

In Fig. 24, I have shown another shape of slot 139, in which the lever 137 can be fixed in the intermediate position, in which piston 150 is in the position of Fig. 21. In the course of the displacement in the direction of arrow $F^2$, above referred to, connecting rod 141 is not actuated, and the locking system remains in the unlocked position. The last displacement, in the direction opposed to arrow $F^1$, without acting on connecting rod 140, brings back connecting rod 141 into the initial position and the safety device into the locking position.

The reverse displacement takes place in the same manner, by first placing the control in the unlocking position and then placing distributing device 142 in the downward movement position, and, finally, the safety device in the locking position, which permits its automatic engagement when the landing gear is at the end of its displacement.

As shown by Figs. 19, 20, 21, and 22, the handle 138 of lever 137 is preferably given the shape of a wheel, which is intended to permit the pilot, without looking at the lever, to immediately know that he is holding the member which controls the extension or the retraction of the landing gear. As a matter of fact, the pilot may be executing a maneuver intended to actuate his landing gear at a time when he is not able to look at the control which he is to grasp. The shape of the handle prevents any mistake.

As a matter of fact, the invention includes, in a general way, the principle of giving the handle of a control of an airplane a shape which reminds the pilot of the nature of the device actuated through this handle, without having to look at this handle.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A retractable landing gear for an airplane which comprises, in combination, at least two struts pivotally connected together and each pivotally connected to said airplane, a wheel carried by one of said struts, one of said struts being of jointed structure and including two elements articulated with respect to each other, an operating device, wholly supported by said jointed strut and mechanically independent of the airplane proper, including two parts movable with respect to each other, one of said parts being mechanically connected to said strut elements, mechanical means for interconnecting the other part of said device with each of these two strut elements in such manner that relative displacements of these two parts of the device produce angular displacements of the strut elements, and means, operative from the airplane proper, for producing displacements of said two parts of the operating device with respect to each other.

2. A retractable landing gear for an airplane which comprises, in combination, at least two struts pivotally connected together and each pivotally connected to said airplane, a wheel carried by one of said struts, one of said struts being of jointed structure and including two elements articulated with respect to each other, and a jack operative from said airplane proper, wholly supported by said jointed strut and mechanically independent of said airplane proper, said jack including two parts slidable with respect to each other and one of which is mechanically connected to said strut elements, and mechanical means for interconnecting the other part of said jack with each of these two strut elements in such manner that, when said jack is retracted, said strut elements are in line, at least substantially, with each other, while, when said jack is expanded, said strut elements are caused to pivot toward each other.

3. A retractable landing gear for an airplane which comprises, in combination, at least two struts pivotally connected together and each pivotally connected to said airplane, a wheel carried by one of said struts, one of said struts being of jointed structure and including two elements articulated with respect to each other, a jack operative from said airplane proper wholly supported by said jointed strut and mechanically independent of said airplane proper, said jack including two parts movable with respect to each other and one of which is pivotally connected to each of said strut elements, and connecting rods interposed between the other part of said jack and each of said strut elements, said connecting rods being so dimensioned and assembled with said jack and said jointed strut as to keep said strut elements in line, at least substantially, with each other when the jack is retracted, whereby retraction of the landing gear is obtained by causing the jack to extend so that said strut elements are pivoted toward each other.

4. A retracted landing gear according to claim 3 in which the extended position of the landing gear corresponds to these strut elements being brought slightly beyond their dead center position, said gear further including cooperating stops for limiting this movement of said strut elements beyond said dead center position carried by said strut elements and said jack, respectively.

5. A retractable landing gear for an airplane which comprises, in combination, at least two struts pivotally connected together and each pivotally connected to said airplane, a wheel carried by one of said struts, one of said struts being of jointed structure and including two elements articulated with respect to each other, a jack operative from said airplane proper wholly supported by said jointed strut and mechanically independent of said airplane proper, said jack including two parts slidable with respect to each other and one of which is pivotally connected to each of said strut elements, connecting rods interposed between the other part of said jack and each of said strut elements, said connecting rods being so dimensioned and assembled with said jack and said jointed strut as to keep said strut elements in line, at least substantially, with each other, when the jack is retracted, which corresponds to the extended position of the landing gear, whereas retraction of the landing gear is obtained by causing the jack to extend so that said strut elements are pivoted toward each other, and means, elastically opposing the extension of said jack, for automatically bringing said strut elements in line with each other as soon as said jack ceases to work.

6. A retractable landing gear according to claim 5 in which the last mentioned means include elastic cables each fixed at one end to the first mentioned part of said jack and at the other end to one of said strut elements, respectively, and means, carried by said first mentioned part of the jack adapted to cooperate with said elastic cables so as to tension them when said jack is being extended.

7. A retractable landing gear according to claim 5 in which said last mentioned means include a telescopic rod, pivoted at one end to said airplane proper and at the other end to said jointed strut, and elastic means in said rod for yieldingly opposing the pivoting movement of the strut elements toward each other.

8. A retractable landing gear for an airplane which comprises, in combination, at least two struts pivotally connected together and each pivotally connected to said airplane, a wheel carried by one of said struts, one of said struts being of jointed structure and including two elements articulated with respect to each other, a jack operative from said airplane proper wholly supported by said jointed strut and mechanically independent of said airplane proper, said jack including two parts slidable with respect to each other and one of which is pivotally connected to each of said strut elements, connecting rods interposed between the other part of said jack and each of said strut elements, said connecting rods being so dimensioned and assembled with said jack and said jointed strut as to keep said strut elements in line, at least substantially, with each other when said jack is retracted, which corresponds to the extended position of the landing gear, whereas retraction of the landing gear is obtained by causing the jack to extend so that said strut elements are pivoted toward each other, and means, operative from the airplane proper, for locking in a positive manner said strut elements in the position thereof corresponding to the landing gear being extended.

9. A retractable landing gear according to claim 8 in which said last mentioned means include a locking piece adapted to engage said strut elements in the extended position thereof, movably carried by said first mentioned part of said jack, elastic means for urging said locking piece toward the position in which it is engaged with said strut elements, and means, operative from the airplane proper, for moving said locking piece, against the action of said elastic means, out of engagement with said strut elements.

10. A retractable landing gear according to claim 8 in which said last mentioned means include a bar, transverse to the axis of said jack, movable in the direction of said axis, hooks at the respective ends of said bar, lugs carried by said strut elements adapted to engage between said hooks, elastic means for urging said bar toward said lugs, the outer faces of said hooks and the cooperating parts of said lugs being made of rounded shape, whereby, when said strut elements are brought into line with each other, said lugs can move said bar axially against the action of said elastic means so as to be able to snap into locked position between said hooks.

11. A retractable landing gear according to claim 8 in which said last mentioned means include a locking piece adapted to engage said strut elements in the extended position thereof, slidably carried by the first mentioned part of said jack parallelly to the axis thereof, elastic means for urging said locking piece toward the position in which it engages said strut elements, a cylinder, adapted to be fed with fluid under pressure from the airplane proper, carried by one of said strut elements, a piston, operative by said fluid under pressure, movable in said cylinder, and a mechanical transmission between said piston and said locking piece adapted to move the latter, against the action of said elastic means, out of engagement with said strut elements.

12. A retractable landing gear according to claim 8 in which said last mentioned means include a locking piece adapted to engage said strut elements in the extended position thereof, slidably carried by said first mentioned part of said jack, parallelly to the axis thereof, a spring interposed between said part of the jack and said locking piece for urging said locking piece toward the position in which it engages said strut elements, a cylinder carried by said part of the jack, adapted to be fed with fluid under pressure from the airplane proper, and a piston, operative by said fluid under pressure, movable in said cylinder, directly connected with said locking piece, whereby the latter can be moved, against the action of said spring, out of engagement with said strut elements.

13. A retractable landing gear for an airplane which comprises, in combination, at least two struts pivotally connected together and each pivotally connected to said airplane, a wheel carried by one of said struts, one of said struts being of jointed structure and including two elements articulated with respect to each other, a jack operative from said airplane proper wholly supported by said jointed strut and mechanically independent of said airplane proper, said jack including two parts slidable with respect to each other and one of which is pivotally connected to each of said strut elements, connecting rods interposed between the other part of said jack and each of said strut elements, said connecting rods being so dimensioned and assembled with said jack and said jointed struts as to keep said strut elements in line, at least substantially, with each other when said jack is retracted, which corresponds to the extended position of the landing gear, while retraction of the landing gear is obtained by causing the jack to extend so that said strut elements are pivoted toward each other, means, operative from the airplane proper, for locking in a positive manner said strut element in the position thereof for which said landing gear is extended, and a single operating member for controlling the working of said jack and that of said locking means in such manner that said locking means are necessarily brought out of action before said jack is allowed to retract.

14. A system according to claim 13 in which said single operating member consists of a lever, further including a support for said lever mounted on the airplane proper, said lever being adapted to pivot in two directions at right angles to each other with respect to said support, means for transmitting the displacements of said lever in one of these directions merely to said jack, means for transmitting the displacements of said lever in the other direction merely to said locking means, and an element carried by said support provided with a slot through which said lever extends, said slot including parts parallel to the first mentioned direction and parts parallel to the other direction.

15. A system according to claim 13 in which said single operating member consists of a lever, further including a support for said lever mounted on the airplane proper, said lever being adapted to pivot in two directions at right angles to each other with respect to said support, means for transmitting the displacements of said lever in one of these directions merely to said jack, means for transmitting the displacements of said lever in the other direction merely to said locking means, and a plate carried by said support provided with a slot through which said lever extends, said slot being in the shape of a U with its branches parallel to one of these directions.

16. A system according to claim 13 in which said single operating member consists of a lever, further including a support for said lever mounted on the airplane proper, said lever being adapted to pivot in two directions at right angles to each other with respect to said support, means for transmitting the displacements of said lever in one of these directions merely to the control means of said jack, means for transmitting the displacements of said lever in the other direction merely to said locking means, and a plate carried by said support provided with a slot through which said lever extends, said slot being of the shape of an E, with the branches parallel to the first mentioned direction.

17. A system according to claim 13 in which the head of said lever is in the shape of a wheel or disc.

18. A system according to claim 2 further including a lever for operating said jack, the head of said lever being in the shape of a wheel or disc.

RAYMOND SAULNIER.